(12) United States Patent
Lin et al.

(10) Patent No.: US 11,120,675 B2
(45) Date of Patent: Sep. 14, 2021

(54) SMART MOTION DETECTION DEVICE

(71) Applicant: PixArt Imaging Inc., Hsin-Chu (TW)

(72) Inventors: Han-Chang Lin, Hsin-Chu (TW);
Shiue-Shin Liu, Hsin-Chu (TW);
Shuen-Yin Bai, Hsin-Chu (TW)

(73) Assignee: Pix Art Imaging Inc., Hsin-Chu (TW)

( * ) Notice: Subject to any disclaimer, the term of this patent is extended or adjusted under 35 U.S.C. 154(b) by 0 days.

(21) Appl. No.: 16/521,535

(22) Filed: Jul. 24, 2019

(65) Prior Publication Data
US 2021/0027590 A1 Jan. 28, 2021

(51) Int. Cl.
| | | |
|---|---|---|
| G08B 13/196 | (2006.01) | |
| G08B 13/19 | (2006.01) | |
| H04N 5/232 | (2006.01) | |
| G08B 21/18 | (2006.01) | |
| G06K 9/00 | (2006.01) | |
| G06T 7/194 | (2017.01) | |

(52) U.S. Cl.
CPC ... *G08B 13/19602* (2013.01); *G06K 9/00771* (2013.01); *G06T 7/194* (2017.01); *G08B 13/19* (2013.01); *G08B 21/182* (2013.01); *H04N 5/23245* (2013.01); *G06T 2207/20224* (2013.01); *G06T 2207/30168* (2013.01); *H04N 5/232411* (2018.08)

(58) Field of Classification Search
CPC .............. G08B 13/19602; H04N 5/23245
See application file for complete search history.

(56) References Cited

U.S. PATENT DOCUMENTS

| | | | | |
|---|---|---|---|---|
| 7,075,567 B2* | 7/2006 | Hunter | ............ | G08B 13/19608 |
| | | | | 348/208.13 |
| 7,643,056 B2* | 1/2010 | Silsby | .............. | G08B 13/19684 |
| | | | | 348/155 |
| 8,218,819 B2* | 7/2012 | Cobb | ................. | G06K 9/00771 |
| | | | | 382/103 |
| 9,467,647 B2* | 10/2016 | Cai | ....................... | H04N 7/181 |
| 9,621,749 B2* | 4/2017 | Jung | ................... | H04N 1/00352 |
| 9,930,299 B2* | 3/2018 | Modestine | .............. | H04N 5/77 |
| 10,511,783 B2* | 12/2019 | Ko | .......................... | H04N 5/238 |
| 10,529,206 B2* | 1/2020 | Sacre | ............. | G08B 13/19656 |
| 10,803,719 B1* | 10/2020 | Skeoch | ................. | H02M 7/064 |
| 10,841,542 B2* | 11/2020 | Siminoff | .......... | G08B 13/19602 |
| 2003/0025800 A1* | 2/2003 | Hunter | ................... | H04N 7/181 |
| | | | | 348/208.13 |
| 2008/0267521 A1* | 10/2008 | Gao | .................. | H04N 5/23248 |
| | | | | 382/254 |
| 2015/0305114 A1* | 10/2015 | Hack | ...................... | H05B 45/60 |
| | | | | 315/153 |
| 2016/0104510 A1* | 4/2016 | Tamir | ................. | H04N 5/23238 |
| | | | | 386/223 |
| 2016/0110973 A1* | 4/2016 | Cho | ...................... | A01M 29/10 |
| | | | | 348/143 |
| 2016/0277688 A1* | 9/2016 | Gaskamp | ............. | H04N 5/2252 |
| 2019/0228803 A1* | 7/2019 | Tadaoka | .................. | G06F 12/16 |
| 2020/0111335 A1* | 4/2020 | Gagnon | ............ | G06K 9/00771 |

\* cited by examiner

*Primary Examiner* — Irfan Habib
(74) *Attorney, Agent, or Firm* — Winston Hsu

(57) ABSTRACT

A smart motion detection device includes an image sensor, an infrared sensor and a processor. The image sensor captures a monitoring image. The infrared sensor detects a thermal motion condition and provides an alarm signal accordingly. The processor executes an image recording mode of the image sensor only according to the alarm signal when an image quality of the monitoring image is unacceptable.

13 Claims, 6 Drawing Sheets

SMART MOTION DETECTION DEVICE

BACKGROUND OF THE INVENTION

1. Field of the Invention

The present invention relates to a motion detection device, and more particularly, to a smart motion detection device capable of utilizing a temperature sensor to determine reliability of an external thermal sensor.

2. Description of the Prior Art

Please refer to FIG. 6. FIG. 6 is diagram of a monitoring system 70 in prior art. The monitoring system 70 includes a passive detector 72 and an image detection device 74 electrically connected to an external host 76. The passive detector 72 can transmit a triggering signal to the external host 76 while detecting temperature variation, the external host 76 wakes up by the triggering signal and then actuates the image detection device 74, and the image detection device 74 executes an exposure adjustment while being actuated and starts to capture a monitoring image or to record monitoring video. Thus, even though the passive detector 72 detects the temperature variation, the image detection device 74 captures the monitoring image at a later time in relation to a transmission period of the triggering signal, wakeup periods of the external host 76 and the image detection device 74, and an exposure adjustment period of the image detection device 74, so that the monitoring system 70 cannot record the monitoring video right after the passive detector 72 detects an unusual state.

SUMMARY OF THE INVENTION

The present invention provides a smart motion detection device capable of utilizing a temperature sensor to determine reliability of an external thermal sensor for solving above drawbacks.

According to the claimed invention, a smart motion detection device includes an image sensor, an infrared sensor and a processor. The image sensor captures a monitoring image. The infrared sensor detects a thermal motion condition and provides an alarm signal accordingly. The processor executes an image recording mode of the image sensor only according to the alarm signal when an image quality of the monitoring image is unacceptable.

According to the claimed invention, the alarm signal is provided to the image sensor, and the processor is triggered by the image sensor to execute the image recording mode of the image sensor. The image sensor further determines if an object is identified in the monitoring image, and if the object is identified in the monitoring image then the image sensor performs an image recognition to check the identity of the object. The monitoring image is subtracted by the background image before been determined if the object is identified. The monitoring image is subtracted by a background image before been put to check its image quality.

According to the claimed invention, a smart motion detection device includes an image sensor, an infrared sensor and a processor. The image sensor captures a monitoring image. The infrared sensor detects a thermal motion condition and provides an alarm signal accordingly. The processor executes an image recording mode of the image sensor only according to the monitoring image when an ambient temperature surrounding the infrared sensor greater than a temperature threshold.

According to the claimed invention, the alarm signal is provided to the image sensor, and the processor is triggered by the image sensor to execute the image recording mode of the image sensor. The smart motion detection device includes an temperature sensor adapted to detect an ambient temperature around the infrared sensor to provide a temperature signal to the image sensor. The temperature signal is determined by the image sensor to identify if the ambient temperature surrounding the infrared sensor greater than a temperature threshold.

According to the claimed invention, the image sensor further determines if an object is identified in the monitoring image, and if the object is identified in the monitoring image then the image sensor performs an image recognition to check the identity of the object. The monitoring image is subtracted by the background image before been determined if the object is identified. The monitoring image is subtracted by a background image before been put to check its image quality.

According to the claimed invention, a smart motion detection device includes an image sensor, an infrared sensor and a processor. The processor is electrically connected to the infrared sensor. The image sensor captures a monitoring image. The infrared sensor detects a thermal motion condition and provides an alarm signal accordingly. The image sensor receives the alarm signal and decides to trigger the processor to execute an image recording mode of the image sensor according to the monitoring image and the alarm signal.

According to the claimed invention, the smart motion detection device further includes a temperature sensor adapted to detect an ambient temperature around the infrared sensor to provide a temperature signal to the image sensor. The image sensor decides to trigger the processor only by the monitoring image and bypasses the alarm signal when the temperature signal is greater than a temperature threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
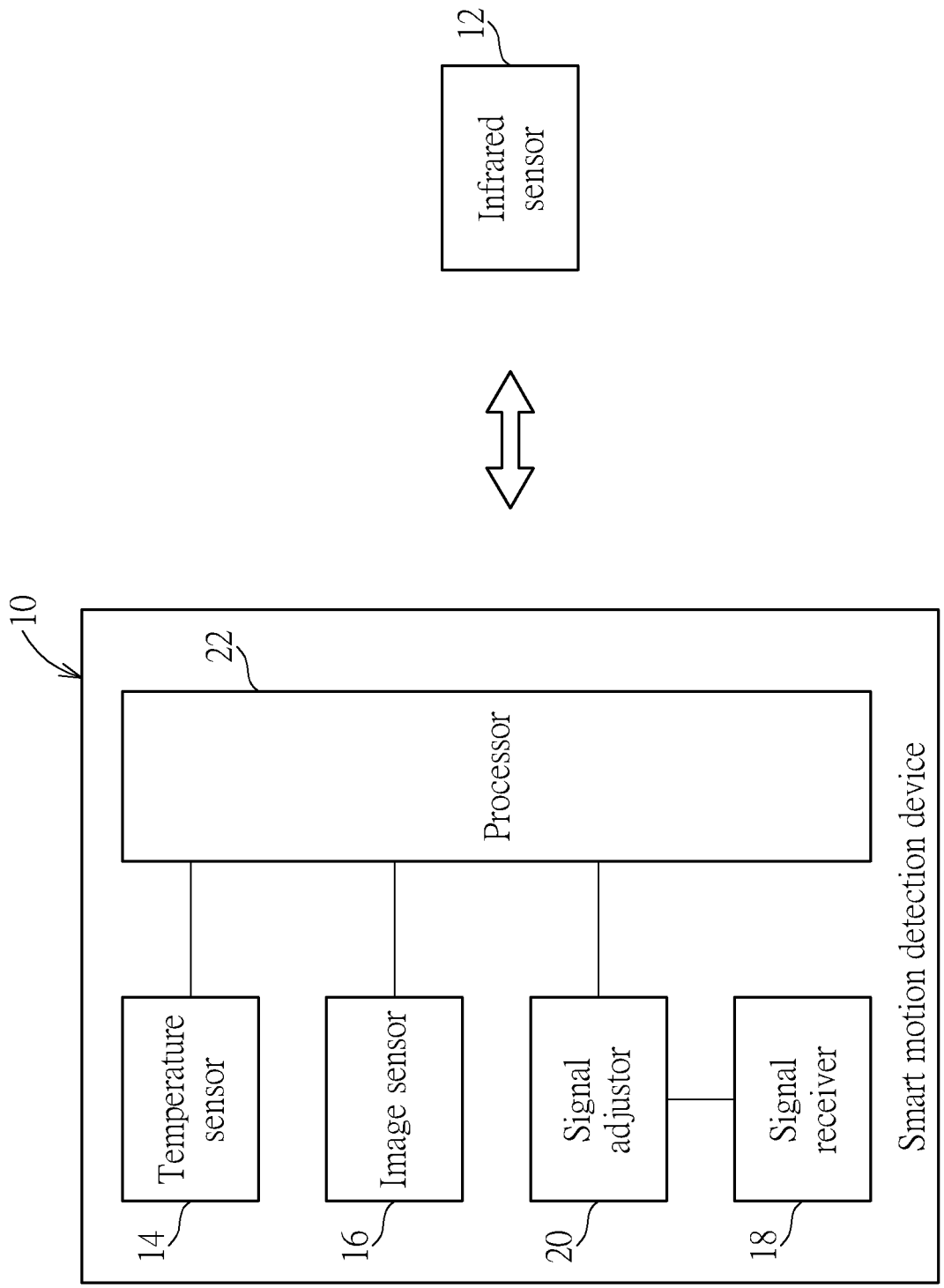
FIG. 1 to FIG. 3 are functional block diagram of a smart motion detection device according to different embodiments of the present invention.
Figure 2:
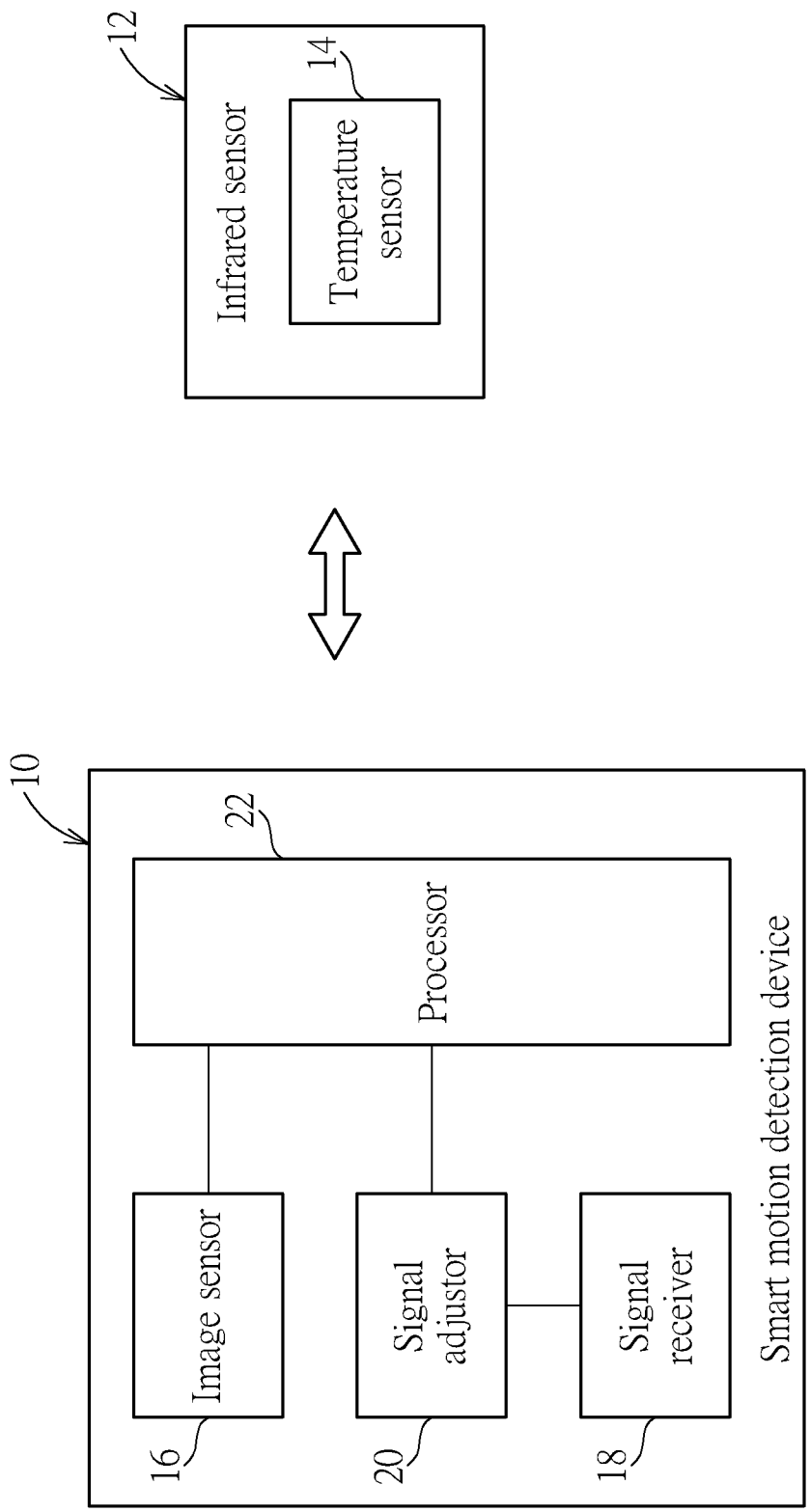
Figure 3:
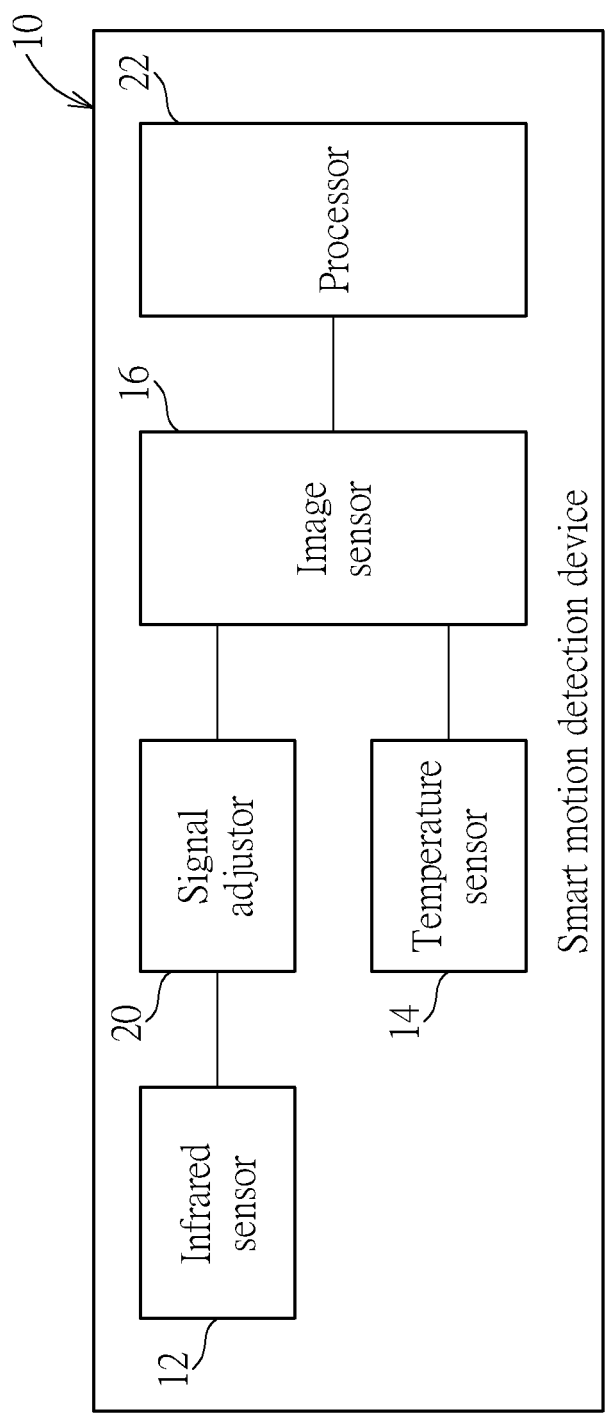

Please refer to FIG. 1 to FIG. 3. FIG. 1 to FIG. 3 are functional block diagram of a smart motion detection device 10 according to different embodiments of the present invention. The smart motion detection device 10 can provide a high-precision motion detection function via various sensors. The smart motion detection device 10 may be applied to a smart wearable device or a monitoring apparatus. The smart motion detection device 10 can utilize the various sensors to acquire an accurate motion detection result at any place; for example, the smart motion detection device 10 may be positioned in cold environment, under torrid sun, within over-bright circumstance or over-dark circumstance but still can clearly distinguish a target object from the background. The target object can be a human walking inside a detection region of the smart motion detection device 10.

The smart motion detection device 10 can utilize motion detection results of at least two sensors to overcome extreme circumstanced condition. Functions of the sensor can be varied in accordance with the circumstanced condition. In the present invention, a thermal sensor and an illumination sensor are applied to improve a final motion detection result of the smart motion detection device 10 if the smart motion detection device 10 is operated under the torrid sun or in the nighttime. The thermal sensor may be used to adapt the smart motion detection device 10 to climate change, and the illumination sensor may be used to adapt the smart motion detection device 10 to the sunshine or the dark. An amount and a property of the sensor are not limited to the above-mentioned embodiments, which depend on actual demand.

The smart motion detection device 10 can be matched with an infrared sensor 12, such as PIR sensor, and a temperature sensor 14. As the embodiment shown in FIG. 1, the smart motion detection device 10 can include an image sensor 16, a signal receiver 18, a signal adjustor 20 and a processor 22. The processor 22 receives signals or results from the temperature sensor 14 and the image sensor 16, and further receives signals or results from the signal receiver 18 via the signal adjustor 20. The processor 22 further executes an image recording mode of the image sensor 16 to output or store a video or a series of images captured by the image sensor 16.

The infrared sensor 12 can be used to monitor a thermal motion condition and to detect a thermal change so as to output an alarm signal. The temperature sensor 14 can be used to acquire an ambient temperature around the smart motion detection device 10 or the infrared sensor 12. The image sensor 16 can capture a monitoring image about the detection region. The processor 22 can analyze a temperature signal from the temperature sensor 14 to decide whether the result of the thermal motion detection, which means the alarm signal, is reliable. The alarm signal can actuate the image sensor 16 switched from a turn-off mode to a turned-on mode, or from a power saving mode to an image capturing mode or a normal recording mode, wherein in the power saving mode the image sensor 16 may not capture images but only process data input therein. In some situations, the infrared sensor 12 may not be equipped or may not be used in the smart motion detection device 10 and a warning signal is generated according to an object identifying result of the monitoring image from the image sensor 16.

The temperature signal can represent the ambient temperature or any information derived from the ambient temperature. The information can be torrid warning (marked as a symbol H) about high temperature, cozy notice (marked as a symbol M) about medium temperature or frigid warning (marked as a symbol L) about low temperature. The ambient temperature can be transformed into the foresaid information for economizing signal storage and transmission capacity of the smart motion detection device 10.

The processor 22 can receive the alarm signal from the infrared sensor 12 and the temperature signal from the temperature sensor 14, and compare the temperature signal with a temperature threshold to decide whether the alarm signal is reliable in accordance with a temperature comparison result about the temperature signal. The temperature threshold may be a pre-stored datum in a memory of the smart motion detection device 10. In one possible embodiment, the processor 22 may analyze the temperature signal belonging to the symbol H, M or L to decide whether the alarm signal is reliable.

As the embodiment shown in FIG. 2, the temperature sensor 14 can be a built-in element of the infrared sensor 12 to acquire the ambient temperature around the infrared sensor 12 more precisely.

As the embodiment shown in FIG. 3, both the infrared sensor 12 and the temperature sensor 14 are built-in elements of the smart motion detection device 10 and provide their output to the image sensor 16 directly. In this embodiment, the image sensor 16 works as a sub-processor to process the alarm signal and the temperature signal to eliminate the usage of the processor 22. The image sensor 16 can analyze the temperature signal to decide whether the alarm signal is meaningless or reliable. If the alarm signal is reliable, which means the target object being detected by the infrared sensor 12, the image sensor 16 can be switched from the power saving mode to the image capturing mode to capture the monitoring image or switched from the image capturing mode to the normal recording mode to not only capture images but also output record of the monitoring images in a high resolution or a high frame rate, and a result of image motion detection (which means the object identifying result) about the image sensor 16 can be used to determine the final motion detection of the smart motion detection device 10. The image sensor 16 can be driven to record monitoring video when the final motion detection detects the real target object. If the alarm signal is meaningless, the image sensor 16 can be kept in the turned-off mode or the power saving mode for energy economy.

The processor 22 in the embodiments of FIG. 1/2 or the image sensor 16 in the embodiment of FIG. 3 of the present invention can analyze the temperature signal to determine whether the alarm signal is applicable, bypassed or modified, and further analyze an ambient illumination via the image sensor 16 to determine whether the object identifying result is applicable, bypassed or modified. The present invention can utilize the temperature sensor 14 to exclude the inaccurate result of the thermal motion detection when the smart motion detection device 10 is set in overheated circumstance, and utilize the image sensor 16 to exclude the inaccurate result of the image motion detection when the smart motion detection device 10 is set under the sunshine or in the dark; that is to say, the smart motion detection device 10 can effectively improve accuracy of the final motion detection result via composite determination of the thermal motion detection and the image motion detection, so as to prevent the final motion detection result from miscomputation by passing over the thermal motion detection or the image motion detection.

The infrared sensor 12 is used to detect infrared radiation for searching the target object within the detection region of the smart motion detection device 10, and output the alarm signal according to detection result of the infrared radiation. The infrared sensor 12 can be replaced by any passive thermal sensor, and a detailed description of the passive thermal sensor is omitted herein for simplicity. The signal receiver 18 can receive the alarm signal from the infrared sensor 12 in a wire manner or in a wireless manner if the infrared sensor 12 is independent from the smart motion detection device 10, such as the embodiments shown in FIG. 1 and FIG. 2. If the infrared sensor 12 is the built-in element of the 10, such as the embodiment shown in FIG. 3, the alarm signal is transmitted to the image sensor 16 via the signal adjustor 20. The signal adjustor 20 can be used to transform the alarm signal into specific format and send the transformed alarm signal to the image sensor 16.

The processor 22 or the image sensor 16 further can compare an intensity of the monitoring image from the image sensor 16 within a predefined intensity condition to determine whether the object identifying result is applicable, bypassed or modified. The predefined intensity condition can be represented as an over-bright condition and an over-dark condition stored in the memory of the smart motion detection device 10. The final motion detection result can be computed via at least one of the alarm signal and the object identifying result of the monitoring image in accordance with the temperature comparison result about the temperature signal and an intensity comparison result about the intensity of the monitoring image.

Figure 4:
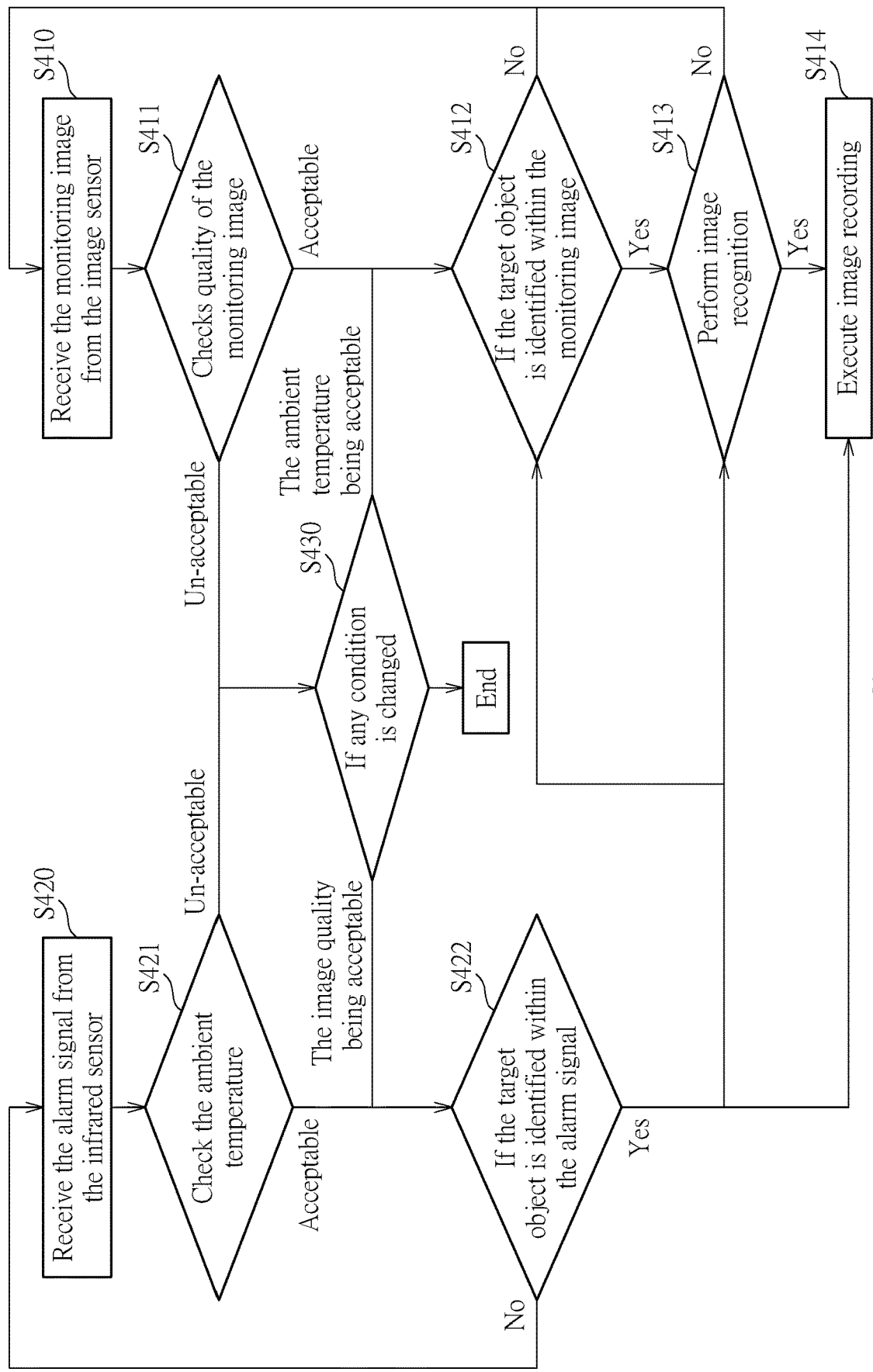
FIG. 4 is a flow chart of a smart motion detection method according to an embodiment of the present invention.

Please refer to FIG. 4. FIG. 4 is a flow chart of a smart motion detection method according to an embodiment of the present invention. The smart motion detection method illustrated in FIG. 4 can be applied to the smart motion detection device 10 shown in FIG. 1 to FIG. 3. First, steps S410 and S411 can be executed to receive the monitoring image from the image sensor 16, and the processor 22 or the image sensor 16 checks quality of the monitoring image to determine whether an imaging result of the image sensor 16 is acceptable. In step S411, the quality can be the intensity or any feature of the monitoring image, for example when an average intensity of the monitoring image lowered or higher than a predetermined threshold or when a standard deviation of the intensity of the monitoring image lowered than a predetermined threshold then the quality of the monitoring image is un-acceptable. It should be noticed that the monitoring image may be subtracted by a background image before being checked in step S410, wherein the background image could be captured by the image sensor 16 in a predefined situation (such as no object moved in the FOV of the image sensor 16).

When the imaging result is acceptable, the intensity of the monitoring image may not match the predefined intensity condition so that the monitoring image can contain a clear pattern of the target object without the over-bright condition or the over-dark condition, and step S412 can be executed to determine if the target object is identified within the monitoring image. Step S412 is used to identify whether the target object exists via low computation analysis, without executing high-computational image recognition; for example, step S412 may compute a standard deviation of the monitoring image (already subtracted by the background image), and the monitoring image can be acquired in a low frame rate.

The compute result can be represented as the warning signal and used to compare with a warning threshold. The warning threshold can be a pre-stored datum in the memory of the smart motion detection device 10. If the standard deviation is smaller than or equal to the warning threshold, the target object cannot be identified within the monitoring image, and step S410 can be executed accordingly. If the standard deviation is greater than the warning threshold, the target object can be identified within the monitoring image, so that step S413 can be executed to perform image recognition.

In step S413, the smart motion detection method may switch the image sensor 16 from the low frame rate mode to a high frame rate mode for the image recognition. The image recognition computes a contour of the target object to identify the identity of the object. When the image recognition does not confirm the target object, step S410 is executed and the frame rate of the image sensor 16 may be decreased for energy economy. When the image recognition confirms the target object, step S414 can be executed to increase a resolution of the image sensor 16 for the image recording.

In addition, steps S420 and S421 can be executed to receive the alarm signal from the infrared sensor 12, and check the ambient temperature through the temperature signal from the temperature sensor 14; meanwhile, the image sensor 16 can be turned off or keep in the power saving mode or image capturing mode with low frame rate for energy economy. In step S421, the temperature signal can be compared with the temperature threshold or determined whether to belong to the symbol H, M or L. When the temperature signal is smaller than or equal to the temperature threshold or the temperature signal belongs to the symbol M or L, the ambient temperature is acceptable and the thermal motion detection of the infrared sensor 12 means to be effective, so that step S422 can be executed to decide if the target object is identified within the alarm signal. In step S422, the alarm signal can be compared with the alarm threshold. As the alarm signal is smaller than or equal to the alarm threshold, the target object cannot be identified within the alarm signal, and step S420 is executed accordingly. As the alarm signal is greater than the alarm threshold, the target object can be identified within the alarm signal, and the smart motion detection method can optionally execute steps S412, S413 or S414.

In a first situation, when the target object is identified within the alarm signal and the image sensor 16 is in the low frame rate mode, the smart motion detection method can execute step S412 to identify if the target object is within the monitoring image via the low-frame-rate image sensor 16. In a second situation, when the target object is identified within the alarm signal and the image sensor 16 is in the high frame rate mode, the smart motion detection method can execute step S413 to perform the image recognition. In a third situation, the image sensor 16 can be directly actuated in step S414 to execute the image recording when the target object is identified within the alarm signal and the quality of the image sensor is un-acceptable.

For example, the temperature threshold can be set at 38 degrees centigrade. As the temperature signal is greater than 38 degrees centigrade, the infrared sensor 12 cannot distinguish the target object because its body temperature is close to the temperature signal. The thermal motion detection result should be ignored, which means the alarm signal of the infrared sensor 12 is un-acceptable. As the temperature signal is smaller than or equal to 38 degrees centigrade, the target object can be identified correctly by the infrared sensor 12. The smart motion detection device 10 can analyze the alarm signal from the infrared sensor 12 and determine whether to turn on or switch modes of the image sensor 16.

The monitoring image cannot contain the clear pattern of the target object due to the over-bright condition or the over-dark condition when step S411 determines the quality of the monitoring image is un-acceptable (for example, the intensity of the monitoring image may match the predefined intensity condition). The infrared sensor 12 may not distinguish human temperature from the temperature signal when S421 determines the ambient temperature is un-acceptable (for example, the temperature signal is greater than the temperature threshold or the temperature signal belongs to the symbol H). If steps S411 and S421 both provide the un-acceptable condition, step S430 is executed to monitor any changing of foresaid condition. When the quality of the monitoring image and the ambient temperature are still kept in the un-acceptable condition, the smart motion detection method is ended because thermal motion detection result of the infrared sensor 12 and image motion detection result of the image sensor 16 are unreliable. In step S430, if only the quality of the monitoring image is turned into the acceptable condition, the smart motion detection method may proceed with step S422; if only the ambient temperature is turned into the acceptable condition, the smart motion detection method may proceed with step S412.

It should be mentioned the infrared sensor 12 and the image sensor 16 may be actuated at the same time, or the infrared sensor 12 may be actuated according to an executing result of the image sensor 16, or the image sensor 16 may be actuated according to an executing result of the infrared sensor 12.

In the embodiments shown in FIG. 4, the alarm threshold and the motion detection threshold can be decreased when the temperature signal is close to a predefined temperature, which is the pre-stored data in the memory of the smart motion detection device 10. For example, the alarm threshold (or the motion detection threshold) is a high value for a start, so that the processor 22 which receives the alarm signal (or the final motion detection result) greater than the high-valued alarm threshold (or the high-valued motion detection threshold) can turn on the image sensor 16 accordingly, and the processor 22 which receives the alarm signal (or the motion detection threshold) which is smaller than or equal to the high-valued alarm threshold can keep the image sensor 16 in the current mode. If the temperature signal is close to the predefined temperature, such as 38 degrees centigrade, the alarm threshold (or the motion detection threshold) can be decreased to a low value, and the processor 22 can turn on or switch modes of the image sensor 16 when the alarm signal is easily varied across the low-valued alarm threshold for advanced sensitivity.

Figure 5:
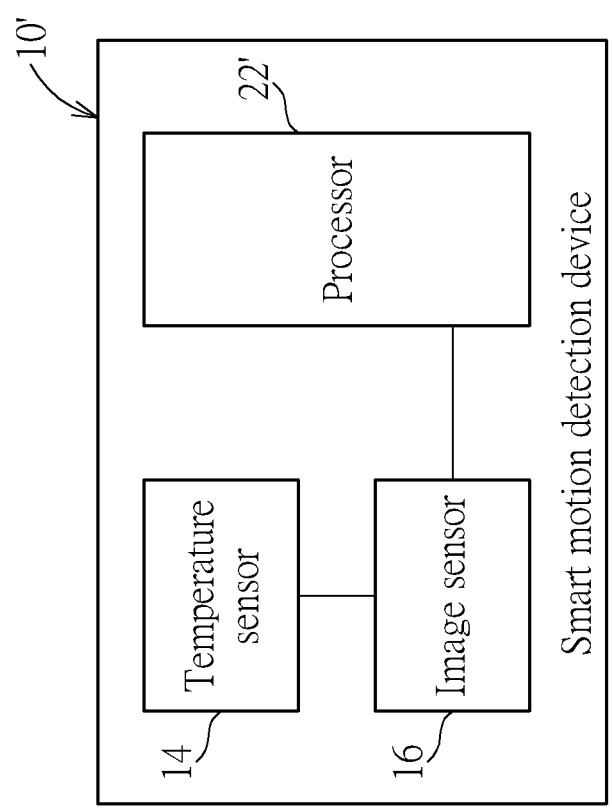
FIG. 5 is a functional block diagram of the smart motion detection device according to another embodiment of the present invention.
Figure 6:
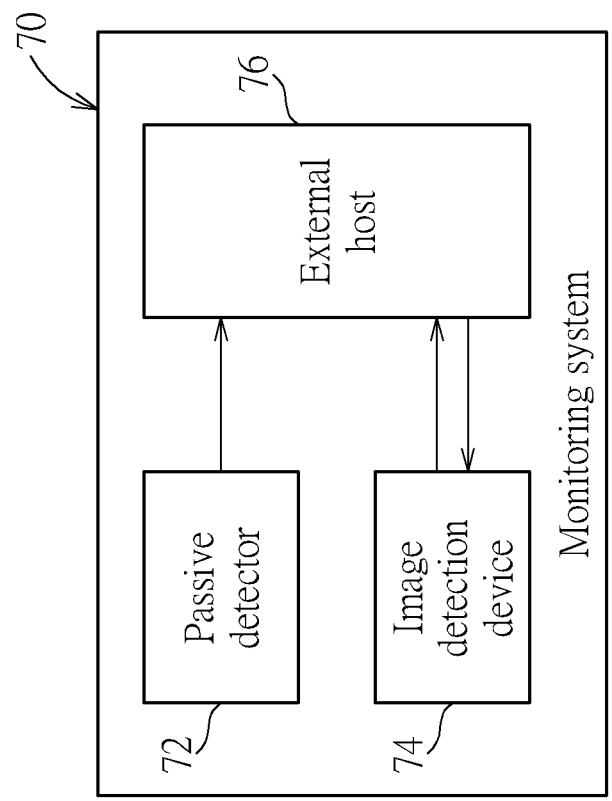
FIG. 6 is diagram of a monitoring system in prior art.

Please refer to FIG. 5. FIG. 5 is a functional block diagram of the smart motion detection device 10' according to another embodiment of the present invention. The smart motion detection device 10' can include the temperature sensor 14, the image sensor 16 and the processor 22'. In this embodiment, elements having the same numeral as ones of the above-mentioned embodiment have the same structure and function, and a detail description is omitted herein for simplicity. The smart motion detection device 10' can be matched with any kind of external thermal sensor, and consider the external thermal sensor cannot acquire an accurate result of thermal motion detection when the smart motion detection device 10' is positioned in the overheated circumstance. Thus, the processor 22' can receive the temperature signal acquired by the temperature sensor 14, and compare the temperature signal with the temperature threshold for determining whether to utilize the image motion detection of the image sensor 16 to replace the thermal motion detection of the external thermal sensor.

If the temperature signal is smaller than or equal to the temperature threshold, the thermal motion detection result of the external thermal sensor is reliable, so that the processor 22' can analyze the alarm signal from the external thermal sensor and determine whether to turn on or switch modes of the image sensor 16; for example, the frame rate of the image sensor 16 can be increased for the image motion detection. The image sensor 16 in the high frame rate mode can acquire the object identifying result used to determine whether the target object is existed. The resolution of the image sensor 16 can be increased when the target object is existed, which means the final motion detection of the smart motion detection device 10' can be determined by the external alarm signal and the object identifying result of the image sensor 16. The frame rate of the image sensor 16 can be decreased when the target object is not existed. If the temperature signal is greater than the temperature threshold, the external thermal sensor ceases to be effective, thus the processor 22' can be used to define a triggering command, and the triggering command can be utilized to switch the image sensor 16 from the power saving mode to the normal recording mode.

In another possible application, the processor 22' may turn on the image sensor 16 to execute the image motion detection, and define the triggering command via a combination of the temperature comparison result about the temperature signal and the object identifying result of the image motion detection. The temperature comparison result and the object identifying result may be adjusted by different weighting in accordance with reliability of the thermal motion detection result and the image motion detection result.

The smart motion detection device can execute the motion detection by the infrared sensor and the image sensor. The thermal motion detection result (such as the alarm signal) of the infrared sensor may be applicable, bypassed or modified in accordance with the temperature signal sensed by the temperature sensor; the image motion detection result (such as the object identifying result) of the image sensor may be applicable, bypassed or modified in accordance with the intensity of the monitoring image. In the beginning, the image sensor is set in the low frame rate mode, and can be switched to the high frame rare mode by the alarm signal or the object identifying result. The image sensor can further be switched from the low resolution mode to the high resolution mode by the object identifying result. In conclusion, the present invention utilizes two sensors to overcome environment change. The smart motion detection device can actuate at least one of the infrared sensor and the image sensor according to the temperature signal and ambient illumination. The smart motion detection device not only can economize energy consumption, but also can speed its start-up time for providing preferred product efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A smart motion detection device, comprising:
   an image sensor adapted to continuously capture monitoring images with low resolution in a standby mode for immediately checking an image quality of the low resolution monitoring image;
   an infrared sensor adapted to detect a thermal motion condition and provide an alarm signal accordingly; and
   a processor adapted to determine the image quality of the low resolution monitoring image being unacceptable for switching the image sensor from the standby mode to an image recording mode by considering the alarm signal and not considering an object identification result of the low resolution monitoring image, and further to determine the image quality being acceptable for switching the image sensor from the standby mode to the image recording mode by considering the alarm signal or the object identification result of the low resolution monitoring image.

2. The smart motion detection device of claim 1, wherein the alarm signal is provided to the image sensor, and the processor is triggered by the image sensor to execute the image recording mode of the image sensor.

3. The smart motion detection device of claim 2, wherein the image sensor further determines if an object is identified in the monitoring image, and if the object is identified in the monitoring image then the image sensor performs an image recognition to check the identity of the object.

4. The smart motion detection device of claim 3, wherein the monitoring image is subtracted by a background image before been determined if the object is identified.

5. The smart motion detection device of claim 1, wherein the monitoring image is subtracted by a background image before been put to check its image quality.

6. A smart motion detection device, comprising:
an image sensor adapted to continuously capture monitoring images with low resolution in a standby mode for immediately checking an image quality of the low resolution monitoring image;
an infrared sensor adapted to detect a thermal motion condition and provide an alarm signal accordingly; and
a processor adapted to determine the image quality of the low resolution monitoring image being acceptable for switching the image sensor from the standby mode to an image recording mode by considering an object identification result of the low resolution monitoring image and not considering the alarm signal when an ambient temperature surrounding the infrared sensor greater than a temperature threshold, and further to determine the image quality being acceptable for switching the image sensor from the standby mode to the image recording mode by considering the alarm signal or the object identification result of the low resolution monitoring image when the ambient temperature is smaller than or equal to the temperature threshold.

7. The smart motion detection device of claim 6, wherein the alarm signal is provided to the image sensor, and the processor is triggered by the image sensor to execute the image recording mode of the image sensor.

8. The smart motion detection device of claim 6, further comprising:
an temperature sensor adapted to detect the ambient temperature around the infrared sensor to provide a temperature signal to the image sensor, and the temperature signal being determined by the image sensor to identify if the ambient temperature surrounding the infrared sensor greater than the temperature threshold.

9. The smart motion detection device of claim 6, wherein the image sensor further determines if an object is identified in the monitoring image, and if the object is identified in the monitoring image then the image sensor performs an image recognition to check the identity of the object.

10. The smart motion detection device of claim 9, wherein the monitoring image is subtracted by the background image before been determined if the object is identified.

11. The smart motion detection device of claim 6, wherein the monitoring image is subtracted by a background image before been put to check its image quality.

12. A smart motion detection device, comprising:
an image sensor adapted to continuously capture monitoring images for immediately checking its image quality;
an infrared sensor adapted to detect a thermal motion condition and provide an alarm signal accordingly; and
a processor;
wherein the image sensor determines the image quality being acceptable and receives the alarm signal for triggering the processor to switch the image sensor from the standby mode to an image recording mode according to an object identification result of one monitoring image captured in the standby mode and the alarm signal, and further determines the image quality being unacceptable and receives the alarm signal for triggering the processor to switch the image sensor from the standby mode to the image recording mode by considering the alarm signal and not considering the object identification result.

13. The smart motion detection device of claim 12, further comprising:
a temperature sensor adapted to detect an ambient temperature around the infrared sensor to provide a temperature signal to the image sensor;
wherein the image sensor decides to trigger the processor only by the monitoring image and bypasses the alarm signal when the temperature signal is greater than a temperature threshold.

* * * * *